Patented Aug. 17, 1948

2,447,463

UNITED STATES PATENT OFFICE 2,447,463

REGENERATION OF STEROID KETONES

Emanuel B. Hershberg, West Orange, N. J., assignor to Schering Corporation, Bloomfield, N. J., a corporation of New Jersey No Drawing. Application July 25, 1947, Serial No. 763,761

5 Claims. (Cl. 260—397.2)

1

This invention relates to a method of regenerating steroid ketones from the reaction products of such ketones with semicarbazide, hydrazines, hydroxylamine, thiosemicarbazide, and aminoguanidine.

An important step in the industrial separation of ketonic hormone intermediates obtained by the oxidation of sterols is the formation of their sparingly soluble derivatives with ketone reagents such as semicarbazide, hydrazines, hydroxylamine, thiosemicarbazide, and aminoguanidine. Typical of such derivatives are the semicarbazones. After suitable purification the semicarbazones may be split by one of several methods and the steroid ketones recovered. Among the previously available methods for effecting this split are the treatment of the semicarbazone with strong acid, subjecting the semicarbazone to an exchange reaction with a ketone or aldehyde in non-aqueous solution, and the recently described treatment with nitrous acid in acetic acid. All of these methods lead to significant amounts of irreversible condensation products or to partial hydrolysis of the acetoxyl groups which are often present in the steroid ketone molecule.

It has now been found that the semicarbazones of steroid ketones, as well as the hydrazones, oximes, and other similar ketone reagent derivatives of steroid ketones, can readily be split with regeneration of the steroid ketone in high yield and purity by reacting the semicarbazone or other ketone reagent derivative with pyruvic acid in acetic acid solution, preferably in the presence of or with the addition of sodium acetate.

The acetic acid medium is particularly important in effecting the regeneration of the ketones from their ketone reagent derivatives by exchange reaction with pyruvic acid. It is a good ionizing medium and the steroid semicarbazones, and the like, are very soluble in the anhydrous acid and to a considerable extent even in dilute aqueous mixtures. This permits an irreversible shift in the equilibrium, and it is often possible to crystallize the less soluble steroid ketones from the reaction mixture of keto-steroid semicarbazone, pyruvic acid, and acetic acid by adding water gradually to the refluxing solution. The ketone is then removed from solution as it is formed, and the yields obtained are nearly quantitative. It is also effective to reflux the solution of the reactants for a short time and then to add water until the saturation point of the ketone is reached. Upon slow cooling the ketone crystallizes from the solution.

To obviate undesirable reactions due to the

2 strongly acid character of pyruvic acid or to improve the solubility differential between the pyruvic acid semicarbazone and the steroid ketone, it is frequently preferable to effect the reaction or the separation in an acetic acid solution buffered with sodium acetate.

In general, a 50% aqueous solution of pyruvic acid is satisfactory for use in the method of the invention. A 50% molal excess over the amount of semicarbazone treated is generally desirable.

The following specific examples illustrate the principles of the invention:

*Dehydroisoandrosterone acetate.*—To a solution of 10.00 g. of dehydroisoandrosterone acetate semicarbazone in 30 cc. of glacial acetic acid warmed to 110° C. is added a solution consisting of 3.2 g. of anhydrous sodium acetate and 7.0 g. of a 50% by weight solution of aqueous pyruvic acid in 15 cc. of hot acetic acid. The second flask is rinsed with an additional 5 cc. portion of acetic acid which is added to the reaction flask. A small amount of semicarbazone may separate at this point but redissolves after shaking for a few minutes. After 10 minutes at 105–110° C. water is added dropwise until 15 cc. has been added and the solution is sufficiently dilute so that refluxing occurs below 110° C. The dropwise addition of water is continued at a rate such that after about 25 minutes a total of 46 cc. of water has been added and the solution is saturated, so that upon seeding and slight cooling the ketone acetate begins to crystallize. The boiling point of the solution is now 105° C. and the addition of water is continued at an increased rate while under reflux so that after an elapsed time of about 35 minutes from the beginning of the addition a total of 100 cc. of water has been added, and the solution is thick with crystalline product. The flask is set aside to cool slowly so that thick needles form which permit easy filtering and washing. After standing from one to two hours in the laboratory the flask is placed in the refrigerator to cool to 0° C. and the product is collected with suction, washed with ice-cold dilute acetic acid (25% by volume), and with water. Upon drying at 110° C. under vacuum for from 1–2 hours there is obtained 8.28 g. of dehydroisoandrosterone acetate (97.2%), M. P. 170.2–170.9° C.

*Dehydroisoandrosterone acetate.*—A suspension of finely divided solid is prepared by diluting a solution of 10.00 g. of dehydroisoandrosterone acetate semicarbazone in 50 cc. of hot acetic acid with 25 cc. of hot water. Thereupon 7.0 g. of 50% pyruvic acid is added and the suspension is heated to reflux. After 5 to 7 minutes the semicarbazone dissolves and the solution is refluxed for 10 minutes longer. Then 75 cc. of water is added over a 10 min. period and the flask is put in the refrigerator to cool slowly. After 2 hours the contents are at about 5° and the crystalline product is collected, washed twice with ice-cold dilute (25%) acetic acid and finally with water. After drying as before, there is obtained 7.90 g. (92.5%), M. P. 170.0–170.7° C.

Dilution of the acetic acid mother liquors with water to a volume of about 900 cc. gives 0.42 g. of solid material which, after reacetylation, may be recrystallized to give 0.38 g. of acetate (4.5%), M. P. 168–170° C.

*Isoandrosterone.*—A solution of 1.00 g. of the semi-carbazone is dissolved in a mixture of 10 cc. of acetic acid, 5 cc. of water and 0.78 g. of 50% pyruvic acid. After refluxing for 1.5 hours 0.37 g. of sodium acetate is added and the solution is diluted with a small amount of water so that saturation is reached at 60–70° C. There is obtained upon cooling 0.64 g. (76%) of isoandrosterone, M. P. 168–171° C.

*Dihydrotestosterone (androstaneone-3-ol-17-($\alpha$)).*—A solution of 0.75 g. of the semicarbazone is dissolved in 5 cc. of acetic acid, 0.59 g. of 50% pyruvic acid and 0.28 g. of sodium acetate, and refluxed for one hour. After diluting with water to saturation and slow cooling and seeding, there is obtained 0.59 g. of product M. P. 175–179° C. (94%). Recrystallization from acetone-ligroin gives 0.52 g. (83%) of dihydrotestosterone, M. P. 180–181.5° C.

*$\Delta^5$-Pregneneol-3-one-20 acetate.*—2.0 g. of the semi-carbazone is warmed to boiling with 1.4 g. of 50% pyruvic acid, 0.64 g. of sodium acetate and 10 cc. of acetic acid. Over a ½ hour period 20 cc. of water is added dropwise which results in saturation of the solution. Upon cooling and seeding there is obtained 1.70 g. (100%) of crystalline material, M. P. 145.5–148.5° C. This is recrystallized from methanol to give 1.49 g. (88%) of glistening white leaflets, M. P. 147–149° C.

*$\Delta^5$-Norcholestenol-3-one-25 acetate.*—2.0 g. of the semicarbazone is refluxed for 10 minutes with a solution from 12 cc. of acetic acid, 3 cc. of water, 1.14 g. of pyruvic acid and 0.52 g. of sodium acetate. Then the solution is cooled to about 90° C., whereupon glistening leaflets begin to separate. More water is added dropwise and the solution is brought to a boil and refluxed. After 30 minutes a total of 17 cc. of water has been added and upon cooling the suspension to 0°, collecting and drying, there is obtained 1.76 g. of ketone M. P. 138.5–141° C. (99%). Recrystallization from dilute acetic acid gives 1.70 g. (96%) of glistening white leaflets, M. P. 139.5–141° C.

*$\Delta^4$-Cholestenone-3.*—5.0 g. of the semicarbazone is suspended in a solution of 25 cc. of acetic acid, 3.1 g. of 50% pyruvic acid and 5 cc. of water and heated to reflux. After 10 minutes 25 cc. of water is added dropwise and the flask is then cooled in an icebath. The milky dilute acid layer is decanted from the viscous oil, which is treated with 50 cc. more of water and brought to a boil. After cooling, the oil slowly crystallizes and the solid is collected, washed with water and dried. The solid thus obtained weighs 4.25 g. (97%), M. P. 80–86° C. Recrystallization of 4.18 g. from acetone-methanol gives 3.81 g. (89%) of cream-colored prisms, M. P. 79–80° C.

*$\Delta^4$-Androstenedione-3,17.*—A solution of 3.00 g. of the disemicarbazone and 4.0 g. of pyruvic acid dissolved in 10 cc. of acetic acid is heated to boiling and 39 cc. of water is added dropwise over a ten-minute period until saturation is reached. Then 1.8 g. of sodium acetate is added and the solution is allowed to cool slowly. There is obtained in two successive crops a total of 1.62 g. (76%) of androstenedione, M. P. 170–172° C.

*Androstenedione.*—1.0 g. of androstenedione dioxime is refluxed with 5 cc. of acetic acid, 10 cc. of water and 1.7 g. of pyruvic acid for 50 minutes. Upon cooling, two crops of needle-shaped crystals are obtained: 0.60 g., M. P. 168–171° C.; and 0.11 g., M. P. 165–167° C. (total 78%).

*Progesterone.*—0.3 g. of progesterone dioxime is refluxed with 0.48 g. of pyruvic acid in 10 cc. of 50% acetic acid for 3 hours. After adding 0.22 g. of sodium acetate and diluting with water to saturation at about 60° there is obtained upon cooling 0.21 g. (77%) of progesterone, M. P. 126–128.5° C.

*Dehydroisoandrosterone acetate.*—Dehydroisoandrosterone acetate is recovered in 75% yield upon refluxing 1.00 g. of the oxime for 4 hours with a solution of 0.78 g. of pyruvic acid and 0.38 g. of sodium acetate in a mixture of 5 cc. of acetic acid and 2 cc. of water.

I claim:

1. A method of regenerating steroid ketones from reaction products of steroid ketones with ketone reagents selected from the group consisting of semicarbazide, hydrazines, hydroxylamine, thiosemicarbazide, and aminoguanidine which comprises heating the steroid ketone reaction product with an acetic acid solution of pyruvic acid.

2. A method of regenerating steroid ketones from reaction products of steroid ketones with ketone reagents selected from the group consisting of semicarbazide, hydrazines, hydroxylamine, thiosemicarbazide, and aminoguanidine which comprises heating the steroid ketone reaction product with an acetic acid solution of pyruvic acid buffered with sodium acetate.

3. A method of regenerating steroid ketones from semicarbazones thereof which comprises heating the semicarbazone with an acetic acid solution of pyruvic acid.

4. A method of regenerating steroid ketones from semicarbazones thereof which comprises heating the semicarbazone with an acetic acid solution of pyruvic acid buffered with sodium acetate.

5. A method of regenerating steroid ketones from semicarbazones thereof which comprises heating the semicarbazone with an acetic acid solution of pyruvic acid and adding sodium acetate to the mixture.

EMANUEL B. HERSHBERG.